US011997495B2

(12) United States Patent
Laina Farell et al.

(10) Patent No.: US 11,997,495 B2
(45) Date of Patent: May 28, 2024

(54) TRANSFER FUNCTIONALITY BETWEEN SECURE ELEMENTS SERVERS

(71) Applicants: TELEFONICA, S.A., Madrid (ES); GIESECKE+DEVRIENT MOBILE SECURITY GMBH, Munich (DE)

(72) Inventors: Joan Carles Laina Farell, Barcelona (ES); José Ignacio Honorato Garcia, Madrid (ES); David Patiño Piedra, Barcelona (ES); Blanca Esther Sanchez Muñoz, Madrid (ES)

( * ) Notice: Subject to any disclaimer, the term of this patent is extended or adjusted under 35 U.S.C. 154(b) by 343 days.

(21) Appl. No.: 17/416,889

(22) PCT Filed: Dec. 18, 2019

(86) PCT No.: PCT/EP2019/086035
§ 371 (c)(1),
(2) Date: Jun. 21, 2021

(87) PCT Pub. No.: WO2020/127544
PCT Pub. Date: Jun. 25, 2020

(65) Prior Publication Data
US 2022/0086648 A1    Mar. 17, 2022

(30) Foreign Application Priority Data

Dec. 21, 2018   (EP) ..................................... 18382978

(51) Int. Cl.
*H04W 12/03*   (2021.01)
*H04W 4/70*    (2018.01)
(Continued)

(52) U.S. Cl.
CPC ............. *H04W 12/35* (2021.01); *H04W 4/70* (2018.02); *H04W 8/205* (2013.01); *H04W 12/03* (2021.01)

(58) Field of Classification Search
CPC combination set(s) only.
See application file for complete search history.

(56) References Cited

U.S. PATENT DOCUMENTS

| 2011/0028125 A1 | 2/2011 | Dehlinger et al. |
| 2015/0303966 A1 | 10/2015 | Lee et al. |

(Continued)

OTHER PUBLICATIONS

"RSP Technical Specification", GSM Association, Version 1.1, Jun. 9, 2016, 125 pages.

(Continued)

*Primary Examiner* — Amal S Zenati
(74) *Attorney, Agent, or Firm* — Gerald E. Helget; Taft Stettinius & Hollister LLP

(57) ABSTRACT

It is provided a method for transferring and managing data packages between a first portable secure element, SE, server implemented in a portable device (100, 200) and a second portable SE server implemented in an embedded UICC, eUICC (120, 240), comprised in a user's device (110, 230) which is local to the portable device (100, 200), the first and second portable SE severs comprising Subscription Manager, SM, functionalities, the method comprises the first and the second portable SE servers establishing off-line communication using local data transport protocols in a secured mode, the first or the second portable SE server implementing first transfer functionalities (140) for performing secure transfer of the data packages and the first or the second portable SE server implementing second transfer functionalities (140) for performing end-to-end securing of the data packages after the secure transfer of the data packages.

15 Claims, 2 Drawing Sheets

(51) Int. Cl.
*H04W 8/20* (2009.01)
*H04W 12/30* (2021.01)

(56) References Cited

U.S. PATENT DOCUMENTS

2016/0020803 A1* 1/2016 Cha ..................... H04W 76/10
455/558
2016/0379006 A1 12/2016 Merrien et al.

OTHER PUBLICATIONS

International Search Report for PCT/EP2019/086035, dated Feb. 3, 2020, 5 pages.

* cited by examiner

TRANSFER FUNCTIONALITY BETWEEN SECURE ELEMENTS SERVERS

Present invention generally relates to devices implementing GSMA functionalities for Subscription Manager Roles for eSIM profiles management in Machine-to-Machine (M2M) and consumer uses cases.

BACKGROUND OF THE INVENTION

GSMA, as representative of telecommunication industry, has defined some specifications to allow downloading, installation and management of mobile operator profiles in a secure way. GSMA published a set of specifications for M2M devices (SGP.01 and SGP.02) and other equivalent set for consumer ones (SGP.21 and SGP.22). Same objective, different use case, different technical implementation.

According to GSMA, downloading in eUICC receiver, e.g. a user or consumer's device having an embedded UICC a mobile operator profile or eSIM profile requires a request from the user's device asking for a downloading and a secure connection between the user's device (containing eUICC) and a Subscription Manager (SM) server.

In case of a eUICC receiver using machine to machine (M2M) GSMA specification, since the M2M is unattended, the SM server must push a triggering to the user's device that starts the mobile operator profile downloading request from the user's device to the SM server without any user action said device.

Current known implementations for the Subscription Manager Functionalities are running only on an on-line remote server. An internet connection between the user's device and a network node is always needed. A remote connection between these two elements can be mobile or fixed, e.g. data connectivity 2G-3G-4G, Wi-Fi, etc. and the user's device can use its own connectivity or alternatively can use a connectivity from a primary device acting as an internet proxy. In case of a M2M use case, the device must have its own connectivity. The profile downloading and management processes require an on-line data connection between the user's device (containing the eUICC) and the Subscription Management server.

The invention "Portable Secure Elements for Subscription Manager Roles" from the same applicant is achieving the GSMA SM Functionalities for eSIM profiles (and other data packages) downloading and installation without requiring an on-line connection between the user's device and the SM server as well as security measures are implemented in order to protect the interests of mobile network operators (MNO). The provisioning of the profiles packages (eSIM) can be loaded into the Port-DP+ Secure Element (SE) server at the SIM's manufacturers during production time. In some situations, the MNO or wireless service provider may remotely download new eSIM profiles from a secure repository server of eSIMs, into the Portable SE at the point of sale (PoS) using desktop connected systems or via over-the-air (OTA) with LTE or Wi-Fi devices.

Hence, similarly as in "Portable Secure Elements for Subscription Manager Roles", there is a need for a technical solution to achieve the off-line transfer of data packages (i.e. eSIM profiles) and its management between local portable tokens having SM server functionalities without requiring an on-line connection between an origin portable token that is owning (storage and management) the data packages and a destination portable token server, as well as security measures to be implemented in order to protect the interests of mobile network operators (MNO).

DESCRIPTION OF THE INVENTION

The present invention solves at least the aforementioned problems by providing a method for managing the local offline transfer of data packages and its management between local Portable Secure Element servers (e.g. a portable token) (from now on referred as Port-DP+ in the present disclosure) without the requirement of an internet connection between the Portable SE servers. The proposed method can be used to secure and local transfer of eSIM profiles, or any other type of profile/subscription/keys/package/OS image, and the management data to manage the data packages in an off-line secured mode between the proposed Port-DP+ SE servers (one origin and one destination).

Additionally, in the same way that the proposed method enables eSIM profile transfer, in another example, the proposed method can be used to transfer other data packages with management data like eUICC OS upgrades in a secured mode between Port-DP+ SE servers.

The proposed method allows to implement secure offline transfer roles on a local Portable SE (e.g. a portable token) server and to perform the secure offline transfer processes between Port-DP+ SE servers. The provisioning of the profiles packages (eSIM) can be loaded into the Port-DP+ Secure Element (SE) server at the SIM's manufacturers during production time. In some situations, the MNO or wireless service provider may remotely download new eSIM profiles from a secure repository server of eSIMs, into the Portable SE at the point of sale (PoS) using desktop connected systems or via over-the-air (OTA) with LTE or Wi-Fi devices. This means that no internet connection is needed, so only local data transport protocols (e.g. peer-to-peer (P2P) protocol) are required. Advantageously, the proposed approach reduces process complexity and devices cost, improving user experience, from an existing on-line connected mechanism to an off-line mechanism.

Hence, the proposed method permits transferring data packages comprising e.g. an eSIM profile from a Port-DP+ to another Port-DP+ in a secure way, and it may assure that the eSIM profile is never active in two portable SE severs elements at same time.

The transfer functionalities can comprise functionalities to identify particular data packages in the Port-DP+ to be transferred to other secure elements. These functionalities can be changed via OTA operations. Furthermore, OTA operations may allow to enable/disable a Port-DP+. This could be needed for several reasons, e.g. detection of synchronization errors, product vulnerabilities, etc.

The transfer process may require a donor Port SM-DP+ to transfer data packages and a receptor SM-DP+ supporting minimum requirements (such as size memory available, protocol compatibility, etc.). In some examples, in case a receptor SM-DP+ cannot not allocate the data packages accordingly, the donor SM-DP+ may cancel the transfer operation.

In case the donor Port SM-DP+ completes a satisfactory transfer, it may delete the data packages. In case the data packages comprise eSIM profiles, the receptor Port SM-DP+ becomes an active SM-DP+ server for the transferred eSIM profiles from the donor Port SM-DP+.

When the data packages comprise eSIM profiles, different configuration policies can be used for performing a secure profile transfer between each Port-DP+, e.g. only one port Port-DP+ must be active with a particular eSIM profile at a time, a successfully transferred eSIM profile in the donor Port-DP+ must be deleted or the donor and the receptor Port-DP+ must rollback to previous a status in case of an error in the transfer.

The Port-DP+ can manage eSIM profiles in a secure mode via secure P2P communication. Hence, the proposed method and Port-DP+ element enables a decentralized model for managing the packages that are managed by Port-DP+ SE servers. In fact, the Port-DP+ element can be reused according to business rules that this solution allows configuring, therefore, it can be offline re-provisioned from another Port-DP+. According to some examples, the eSIM profiles (or any other data package) stored and managed in a Port-DP+ may follow some usage policy rules (out of GSMA specifications). The number of stored eSIM profiles (or any other data package) in a Port-DP+ element depends on the size of the secure element and owner needs.

The Port-DP+ SE can be implemented e.g. on contactless smartcards (from now on referred as Port-DP+ contactless card in the present disclosure) as shown in left side of FIG. 1 (smartcards is general term that applies to regular UICC/eUICC products for telecom business but also to other kind of secure element cards such as credit cards or any secure chip/tamper proof chip, portable tokens, etc. that could run secure applications by itself or as part of other consumer's device) and on SIM cards (UICC) (from now on referred as Port-DP+ SIM card in the present disclosure) as shown in right side of the same FIG. 1 of the present disclosure.

Hence, in a first aspect according to the present disclosure, it is proposed a method for transfer eSIM profiles (or any other data package) and its management data in a user's device in which a Port-DP+ SIM card, the transfer method is performed from Port-DP+ contactless card in a portable device local to the user's device. This is shown in a left to right arrow of the FIG. 1 of the present disclosure.

Hence, in a second aspect according to the present disclosure, it is proposed a method for transfer eSIM profiles (or any other data package) and its management data in a local Port-DP+ contactless card, the transfer method is performed in a user's device in which a Port-DP+ SIM card is located. This is shown in a right to left arrow of the FIG. 1 of the present disclosure.

Hence, in a third aspect according to the present disclosure, it is proposed a method for transfer eSIM profiles (or any other data package) and its management data between two Port-DP+ SIM card, the transfer method is performed from two user's device in which a Port-DP+ SIM card are located. This is shown in FIG. 2 of the present disclosure.

The transfer management between Port-DP+ SE servers (in contactless card or SIM card) of eSIM profiles can comprise downloading, transfer of eSIM profiles or any other type of profile/subscription/keys/package/patch/OS image.

The set of features required for transfer managing of data packages (i.e. eSIM profiles) that can be implemented into the Port-DP+ can comprise interfaces for package transfer. In particular, the method can comprise a step where the Port-DP+ SE server implements first transfer functionalities to perform secure transfer of eSIM profiles in the user's device. The first transfer functionalities can comprise the ES9+ interface used in GSMA for Profile downloading and Session Management (between SM-DP+ and an optional LPA). Furthermore, the method can comprise another step where the Port-DP+ SE server implements second transfer functionalities for performing end-to-end securing of the eSIM profiles management after transfer of the eSIM profiles in the destination Port-DP+ SE server.

The set of Port-DP+ features (comprising transfer interfaces) can be developed on native code or any programming language supported by the selected secure element (such as Javacard in case of smartcards).

Furthermore, the SE server when implementing the first transfer functionalities for performing secure downloading of eSIM profiles may download the eSIM profiles in a Local Profile Assistant, LPA for the SE server comprised in the user's device. Optionally, the LPA can perform third transfer functionalities for profile transfer the eSIM profiles in the Port-DP+ SIM card in the user's device.

The method also comprises a step where the SE server establishes off-line communication with the user's device using local data transport protocols in a secured mode. Data transport protocols running on a local off-line secure mode between the origin Port-DP+ (implemented e.g. in smart cards or SIM cards) and destination Port-DP+ (implemented e.g. in smart cards or SIM cards) are proposed in the present invention. The data transport protocols allow using previous interfaces in a local off-line secure mode without requiring a remote connectivity, contrarily to current previous invention.

An on-line remote connection between the origin and destination Port-DP+ SE server is not required. The user's device receiving (or transferring) the eSIM profile can be connected to the Port-DP+ element via local data transport protocol as peer-to-peer (P2P) protocols such as BT, Near Field Communication (NFC), Wi-Fi Direct, etc. FIGS. 1 and 2 show examples for implementing transfer Functionalities in a Port-DP+ SE servers using NFC protocol, but other protocols like Bluetooth can be used.

Hence, the portable SE server achieves Transfer Management Functionalities. Once the profile is transferred to the destination Port-DP+ SE server, it is available at the receiver to be used to install the eSIM profile in a eUICC as described in the previous invention. Different configuration policies are proposed to allow small customizations of each Port-DP+ SE server.

The Port-DP+ SE can be comprised within a (contact/contactless) smart card or a SE UICC card or any secure chip/tamper proof chip or token that runs in secure application by itself or as part of other device.

In a third aspect, it is proposed a non-transitory digital data storage medium encoding a machine-executable program of instructions to perform the method for implementing Transfer Manager Functionalities according in a Port-DP+ for managing eSIM profiles for a user's device comprising an eUICC.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF A PREFERRED EMBODIMENT

Figure 1:
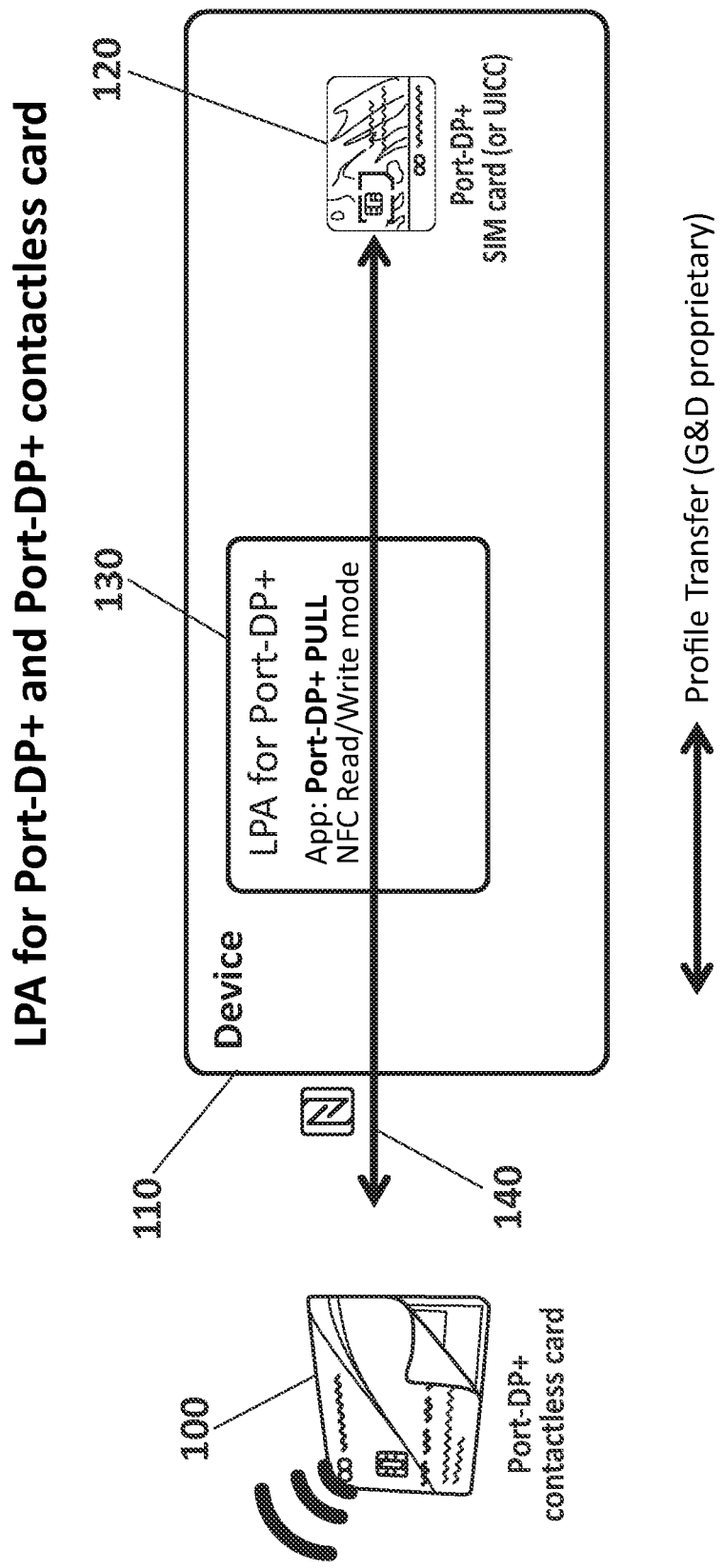
FIG. 1 shows an overview of a diagram for implementing Transfer Management Functionalities based on NFC wherein an example of a first Port-DP+ SE is implemented on a dedicated contactless card while the second Port-DP+ SE is implemented on a SIM card.

FIG. 1 shows a first diagram representing a local off-line secure communication between an example of a Port-DP+ SE on a dedicated contactless card (100) and a an example of a Port-DP+ SIM card (120) in a user's device (110), the user's device (110) comprising a Local Profile Assistant (LPA) (130) for the Port-DP+ based on NFC protocol for this particular implementations. In other examples, the user's device (100) may not comprise a LPA. The Port-DP+ implements transfer functionalities related to e.g. eSIM profile transfer with regard to the Port-DP+ SIM card receiver (120). In other examples, any secure chip/tamper proof chip or token that runs in secure application by itself or as part of other device could perform as Port-DP+.

The Port-DP+ can be provisioned on the dedicated contactless card (100) during issuance or during the usage phase via local device with online connectivity (not shown in this FIG. 1) with the same security level. In the same way, the off-line implementation and communication maintains the same level of security as a conventional GSMA on-line communication. The provisioning of the eSIM profiles can be loaded into the Port-DP+ at the card manufacturing plants of the SIM's manufacturers (like e.g. G+D) during manufacturing of the dedicated contactless card (100). The MNO or wireless service provider may remotely download additional eSIM profiles via on-line mechanism at PoS systems via OTA with LTE, Wi-Fi or any data connectivity protocol.

The dedicated contactless card (100) smartcard acting as a Port-DP+ can store in a secure way the eSIM profiles with subscriptions (or any other data package), can manage the life cycles of the stored eSIM profiles (or any other data package), can validate profile management and its status and can transfer over local data transport protocols such as BT, NFC, etc. to the destination Port-DP+ SIM card (120).

The eUICC that receives the eSIM profile can be inserted in the user's device (110). The user's device (110) can be e.g. smartphone, tablet or any wearable supporting eUICC/UICC+SIM capabilities (actually, the user-s device (100) can be any device hosting eUICC). In fact, the communication between the Port-DP+ SIM card (120) and the Port-DP+ in the dedicated contactless card (100) can be performed, with or without any device "middleware" (native or dedicated app) depending on the origin and destination Port-DP+ capabilities.

Arrow (140) in FIG. 1 represents an off-line communication for performing transfer functionalities. The data transport protocol NFC permits to communication between the Port-DP+ implemented in the dedicated contactless card (100) and the LPA for Port-DP+ (130). Once the eSIM profile (or any other data package) of the Port-DP+ has been downloaded at the LPA for Port-DP+ (130), it can be transferred between the LPA for Port-DP+ (130) and the destination Port-DP+ SIM card (120).

Furthermore, the eSIM profile is secured end-to-end using proprietary interface which is shown in FIG. 1 with arrow (140).

This eSIM profile can remain as "transferred" in the Port-DP+ implemented in the dedicated contactless card (100) or can be deleted. Therefore, this eSIM profile cannot be used again in the origin Port-DP+ (100).

The transfer protocol arrow (140) has defined in both senses, to determine that the sense of the transfer of the eSIM profile (or any other data package) can be send from the origin Port-DP+ contactless card (100) to the destination Port-DP+ SIM card (120), but it can be also in the other way round. That is to say, the transfer of the eSIM profile (or any other data package) can be send from the origin Port-DP+ SIM card (120) to the destination Port-DP+ contactless card (100).

The secured off-line communication between the Port-DP+ implemented in the dedicated contactless card (100) and the Device (110) is shown in the FIG. 1 with the NFC protocol, but it can be used other local protocols.

Figure 2:
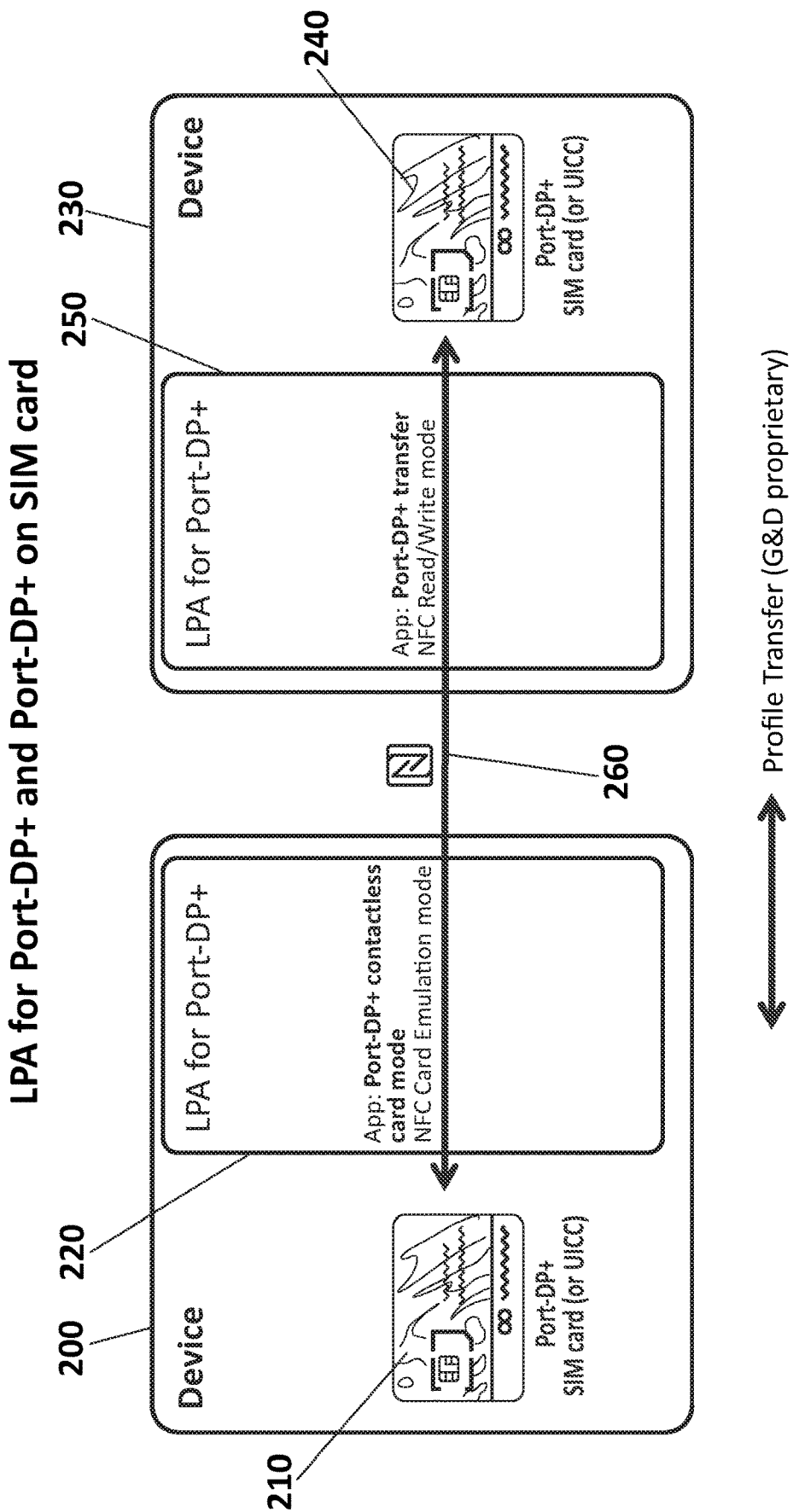
FIG. 2 shows an overview of a diagram for implementing Transfer Management Functionalities based on NFC wherein an example of both Port-DP+ SE are implemented on a SIM card (UICC).

FIG. 2 shows a second diagram representing a local off-line secured communication via NFC protocol between an example of a first Port-DP+ in a UICC (e.g. a SIM card) (210) inserted in a first device 200 comprising a specific LPA for Port-DP+ (220) and an example of a second Port-DP+ SIM card receiver (240) embedded in a second device (230) comprising a specific LPA for Port-DP+ (250).

The local offline secured communication between the origin Port-DP+ UICC (210) and the destination Port-DP+ UICC (240) is done through proprietary interface shown in FIG. 2 with arrow (260).

The data transport protocol NFC permits communication between the Port-DP+ UICC (210) and the LPA for Port-DP+ (250). Once the eSIM profile of the origin Port-DP+ UICC (210) has been downloaded at the LPA for Port-DP+ (250), it is transferred between LPA for Port-DP+ (250) and the destination Port-DP+ UICC (240). The eSIM profile is secured end-to-end.

This eSIM profile can remain as "transferred" in the origin Port-DP+ (210) or can be deleted. Therefore, this eSIM profile cannot be used again to a second eUICC (not shown in the figure) until the control of the profile (or data package) is returned to the origin Port-DP+ (210) and LPA for Port-DP+ (250) deletes this eSIM profile at the destination Port-DP+ UICC (240). e secured off-line communication between the origin Port-DP+ (210) and the Device (230) is shown in the FIG. 2 with the NFC protocol, but it can be used other local protocols.

The term "comprises" and the derivations thereof (such as "comprising", etc.) must not be understood in an exclusive sense, i.e., these terms must not be interpreted as excluding the possibility that what is described and defined may include additional elements, steps, etc.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. Although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed:

1. Method for transferring and managing data packages between a first portable secure element, SE, server implemented in a portable device (100, 200) and a second portable SE server implemented in an embedded UICC, eUICC (120, 240), comprised in a user's device (110, 230) which is local to the portable device (100, 200), the first and second portable SE severs comprising Subscription Manager, SM, functionalities, the method comprising:
   a. the first and the second portable SE servers establishing off-line communication using local data transport protocols in a secured mode, wherein the off-line communication is performed via a connection without the requirement of an interact connection, based on local data transport protocol, peer-to-peer, P2P protocol that comprises Bluetooth, or Near Field Communication, NFC protocol or I Wi-Fi Direct;
   b. the first or the second portable SE server implementing first transfer functionalities (140, 260) for performing secure transfer of the data packages between the two portable SE servers via the off-line communication; and
   c. the first or the second portable SE server implementing second transfer functionalities (140, 260) for performing end-to-end securing of the data packages after the secure transfer of the data packages,
      i. between the two portable SE servers via the off-line communication, wherein end-to-end securing refers to the data packages remaining with a status transferred in the first portable SE server implemented in the portable device or are deleted; and
      ii. wherein the first and the second portable SE servers implement the first transfer functionalities (140, 260) for transferring data packages comprising eUICC OS upgrades.

2. The method for transferring and managing data packages according to claim 1, wherein the first and the second portable SE servers implement the first transfer functionalities (140, 260) for transferring data packages comprising eSIM profiles.

3. The method for transferring and managing data packages according to claim 1, wherein the first portable SE server implementing the first transfer functionalities (140, 260) for transferring data packages comprises downloading the data packages into a Local Profile Assistant, LPA, in the user's device (110) for the second portable SE server, the LPA implementing third transfer functionalities for transferring the data packages in the second portable SE server.

4. The method for transferring and managing data packages according to claim 1, wherein the first and the second portable SE servers implement the first and the second transfer functionalities with native code or any programming language supported by the first and, second portable SE servers.

5. A non-transitory digital data storage medium encoding a machine-executable program of instructions to perform the method carried out by the user's device (110, 230) according to claim 1.

6. A non-transitory digital data storage medium encoding a machine-executable program of instructions to perform the method carried out by the portable device (100, 200) according to claim 1.

7. A portable device (100, 200) comprising a first portable secure element, SE, server configured to transfer and manage data packages with a second portable SE server implemented in an embedded UICC, eUICC, comprised in a user's device (110, 230) the portable device (100, 200) local to the user's device (110, 230), the first portable SE server comprises:
   a. means for establishing off-line communication with the second portable SE server using local data transport protocols in a secured mode wherein the off-line communication is performed via a connection without the requirement of an Internet connection, based on local data transport protocol, peer-to-peer, P2P protocol that comprises Bluetooth, or Near Field Communication, NFC protocol, or Wi-Fi Direct;
   b. means for implementing first transfer functionalities (140, 260) for performing secure transfer of the data packages between the two portable SE servers via the off-line communication; and
   c. means for implementing second transfer functionalities (140, 260) for performing end-to-end securing of the data packages after secure transfer of the data packages between the two portable SE servers the off-line communication,
      i. wherein end-to-end securing refers to the data packages remaining with a status transferred in the first portable SE server implemented in the portable device or are deleted; and
      ii. wherein the first and the second portable SE servers implement the first transfer functionalities (140, 260) for transferring, data packages comprising eUICC OS upgrades.

8. The portable device (100, 200) according to claim 7, wherein the portable device (100, 200) is a (contact/contactless) smart card or a secure memory card or any secure chip/tamper proof chip or token that runs in secure application by itself or as part of other device.

9. The portable device (100, 200) according to claim 7, wherein the portable device (100, 200) is a smartphone, tablet or any wearable supporting an eUICC wherein the first portable SE server is implemented.

10. The portable device (100, 200) according to claim 7, further comprising a Local Profile Assistant, LPA implementing third transfer functionalities for transferring the data packages in the second portable SE server.

11. The portable device (100, 200) according to claim 7, wherein the data packages comprise eSIM profiles and/or eUICC OS upgrades.

12. A user's device (110, 230) comprising a second portable secure element, SE, implemented in an embedded UICC, eUICC (120, 240), configured to transfer and manage data packages with a first portable SE server implemented in a portable device (100, 200) local to the user's device (110, 230), the user's device (110, 230) comprises:
   a. means for establishing off-line communication with the first portable SE server using local data transport protocols in a secured mode; wherein the off-line communication is performed via a connection without the requirement of an Internet connection, based on local data transport protocol, peer-to-peer, P2P protocol that comprises Bluetooth, or Near Field Communication, NFC protocol, or Wi-Fi Direct;
   b. means for implementing first transfer functionalities (140, 260) for performing secure transfer of the data packages between the two portable SE servers via the off-line communication; and c. means for implementing second transfer functionalities (140, 260) for performing end-to-end securing of the data packages after secure transfer of the data packages between the two portable SE servers via the off-line communication,
   i. wherein end-to-end securing refers to the data packages remaining with a status transferred in the first portable SE server implemented in the portable device or are deleted; and
   ii. wherein the first and the second portable SE servers implement the first transfer functionalities (140, 260) for transferring data packages comprising eUICC OS upgrades.

13. The user's device (110, 230) according to claim 12, wherein the user's device (110, 230) is a smartphone, tablet or any wearable supporting eUICC.

14. The user's device (110, 230) according to claim 12, further comprising a Local Profile Assistant, LPA implementing third transfer functionalities for downloading, the data packages transferred from the second portable SE server.

15. The user's device (110, 230) according to claim 12, wherein the means for establishing off-line communication with the user s device (110) comprises means for establishing a Peer two Peer, P2P communication that comprises Bluetooth, or Near Field Communication, NFC protocol, or Wi-Fi Direct.

* * * * *